United States Patent
Dingman et al.

(10) Patent No.: US 7,506,413 B2
(45) Date of Patent: Mar. 24, 2009

(54) WEB POSITION ADJUSTING DEVICE

(75) Inventors: Guy R. Dingman, Lafayette, IN (US); Donald C. Boyle, Indianapolis, IN (US); Thomas Mashino, Kokomo, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 428 days.

(21) Appl. No.: 11/232,714

(22) Filed: Sep. 22, 2005

(65) Prior Publication Data

US 2006/0075609 A1   Apr. 13, 2006

Related U.S. Application Data

(60) Provisional application No. 60/617,160, filed on Oct. 8, 2004.

(51) Int. Cl.
*A44B 11/06* (2006.01)
*A44B 11/12* (2006.01)

(52) U.S. Cl. .......................... 24/170; 24/193

(58) Field of Classification Search .............. 24/170, 24/168, 191, 193, 328, 132 R, 134 KA, 657, 24/658; 606/203
See application file for complete search history.

(56) References Cited

U.S. PATENT DOCUMENTS

| | | | |
|---|---|---|---|
| 330,213 A * | 11/1885 | Deweese ....................... 54/34 |
| 393,090 A * | 11/1888 | Youmans ....................... 54/28 |
| 419,173 A * | 1/1890 | Anguish ....................... 24/180 |
| 722,949 A | 3/1903 | Crowe et al. |
| 866,053 A | 9/1907 | Ohliger et al. |
| 1,722,896 A * | 7/1929 | Carpmill ....................... 24/191 |
| 2,807,067 A * | 9/1957 | Bayon ....................... 24/170 |
| 4,102,343 A * | 7/1978 | Schneider ................... 606/203 |
| 4,660,889 A | 4/1987 | Anthony et al. |
| 4,679,852 A | 7/1987 | Anthony et al. |
| 5,172,455 A * | 12/1992 | Johnson et al. ................ 24/170 |
| 6,560,825 B2 * | 5/2003 | Maciejczyk ................... 24/170 |
| 2003/0019080 A1 | 1/2003 | Anthony et al. |

OTHER PUBLICATIONS

International Search Report from International Application No. PCT/US05/35725.

* cited by examiner

*Primary Examiner*—Robert J Sandy
(74) *Attorney, Agent, or Firm*—Woodard, Emhardt, Moriarty, McNett & Henry LLP

(57) ABSTRACT

A web position adjusting device comprises a frame defining a first web engaging surface, and a web clamping member movably mounted to the frame and defining a second web engaging surface The device is configured to receive a first web therethrough between the frame and the web clamping member with the first web normally clamped between the first and second web engaging surfaces. The web clamping member is movable relative to the frame to move the second web engaging surface away from the first web engaging surface to allow travel of the first web through the device. The device is further configured to receive and allow unimpeded travel therethrough of a second web.

20 Claims, 2 Drawing Sheets

WEB POSITION ADJUSTING DEVICE

CROSS-REFERENCE TO RELATED U.S. APPLICATION

This patent application claims priority to and the benefit of U.S. Provisional Patent Application Ser. No. 60/617,160, filed Oct. 8, 2004, the disclosure of which is incorporated herein by reference.

FIELD OF THE INVENTION

The present invention relates generally to devices for controlling movement of a web, belt or strap therethrough, and more specifically to devices for controlling the position of a first web, belt or strap relative to a second web, belt or strap.

BACKGROUND AND SUMMARY

This invention relates to devices for controlling movement of a first web, belt or strap therethrough to control the position of the first web, belt or strap relative to a second web, belt or strap. U.S. Pat. Nos. 4,660,889, 4,679,852 and U.S. Patent Publication No. US 2003/0019080 A1, which are all assigned to the assignee of the subject disclosure, disclose other known web clamping devices, and these references are each incorporated herein by reference.

The present invention may comprise one or more of the features recited in the attached claims, and/or one or more of the following features and combinations thereof. A web position adjusting device may comprise a frame defining a first web engaging surface. A web clamping member may be movably mounted to the frame, and the web clamping member may define a second web engaging surface. The device may be configured to receive a first web therethrough between the frame and the web clamping member with the web normally clamped between the first and second web engaging surfaces. The web clamping member may be movable relative to the frame to move the second web engaging surface away from the first web engaging surface to allow travel of the first web through the device. The device may be configured to receive and allow unimpeded travel therethrough of a second web. The frame may include a pair of sidewalls with the first web engaging surface extending therebetween. The web clamping member may be pivotally mounted to the frame between the pair of sidewalls. The web clamping member may define a handle portion configured for manual manipulation of the web clamping member.

The web clamping member may further define a protrusion extending into the frame between the pair of sidewalls. The protrusion may be configured to contact the first web so that the first web forces the second web engaging surface toward the first web engaging surface to normally clamp the first web between the first and second web engaging surfaces. The web clamping member may be movable relative to the frame to force the protrusion against the first web while moving the second web engaging surface away from the first web engaging surface to thereby allow travel of the first web through the device.

The frame may define a third web engaging surface extending between the pair of sidewalls and configured to contact the first web. The first and third web engaging surfaces of the frame may define a channel therebetween sized to receive the protrusion of the web clamping member therein.

The web clamping member may be configured to receive and allow travel therethrough of the second web. In this embodiment, the web clamping member may define a web slot therethrough. The web slot may have a first web opening positioned over the second web engaging surface and a second web opening. The web slot may be configured to receive the second web therethrough so that the second web may travel through the web clamping member along same directions of travel of the first web through the device. The web clamping member may further define a flange extending beyond the second web opening with the second web positioned between the flange and the frame. The web clamping member may be responsive to force applied by the second web against the flange to further urge the second web engaging surface of the web clamping member toward the first web engaging surface of the frame and thereby increase a clamping force of the first and second web engaging surfaces against the first web.

Alternatively, the frame may be configured to receive and allow travel therethrough of the second web.

DESCRIPTION OF THE ILLUSTRATIVE EMBODIMENT

Figure 1:
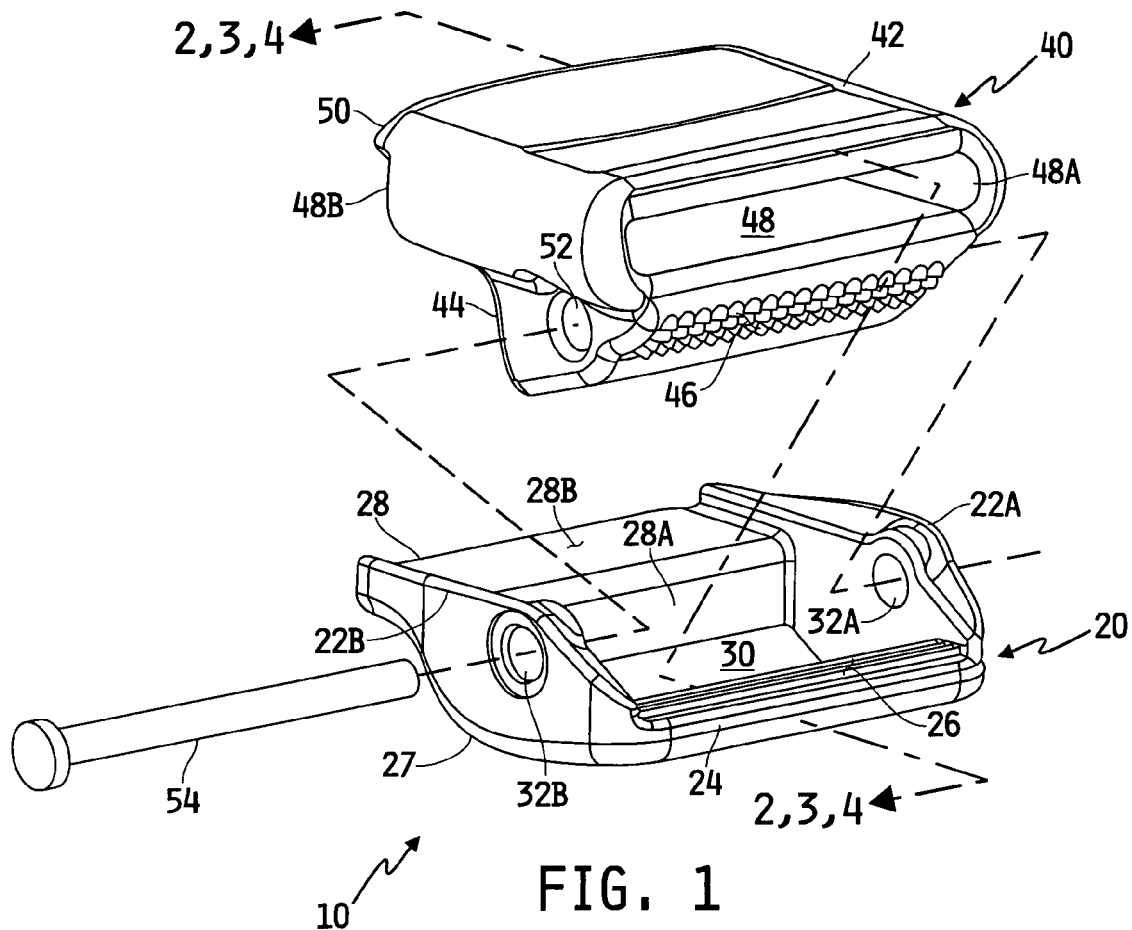
FIG. 1 is a top perspective exploded view of one illustrative embodiment of a web position adjusting device.

For the purposes of promoting an understanding of the principles of the invention, reference will now be made to one illustrative embodiment illustrated in the drawings and specific language will be used to describe the same.

Figure 2:
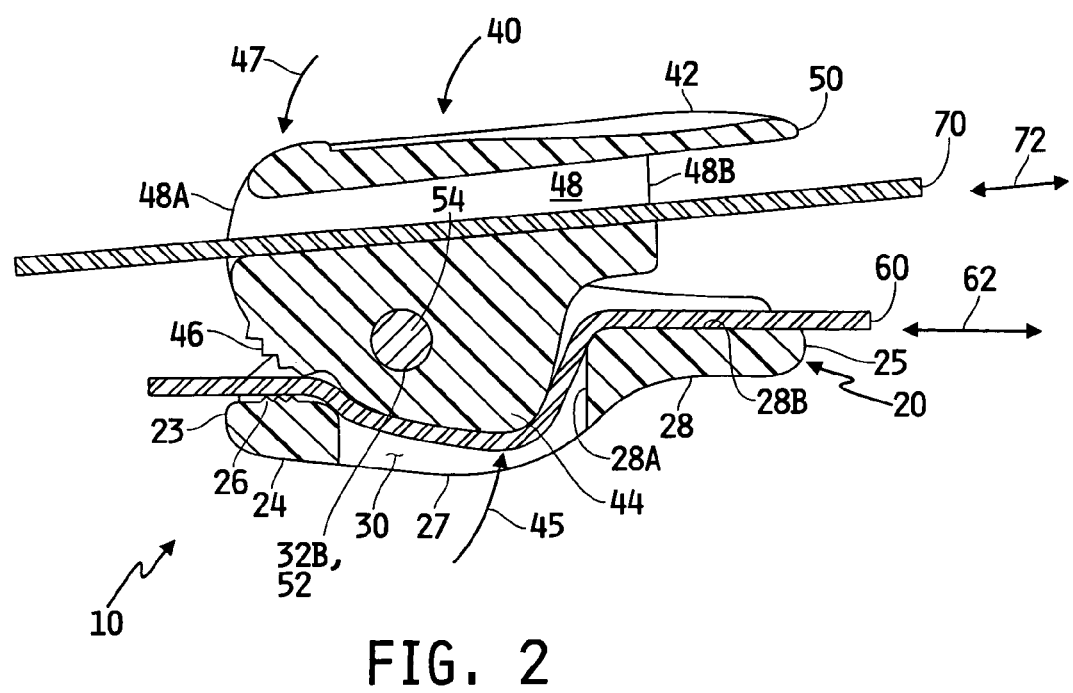
FIG. 2 is a cross-section of the web position adjusting device of FIG. 1, viewed along section lines 2,3,4-2,3,4, illustrating a first web normally clamped between the frame and the web clamping member and a second web slidingly received through the web clamping member so that it may travel through the device in either direction.
Figure 3:
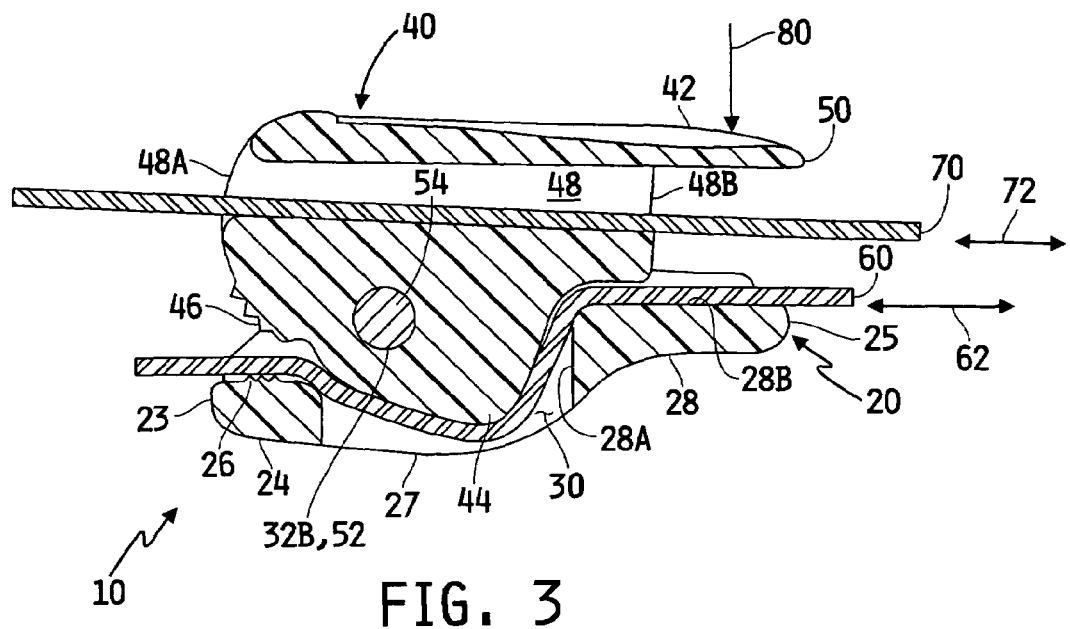
FIG. 3 is a cross-section of the web position adjusting device of FIG. 1, viewed along section lines 2,3,4-2,3,4, illustrating the web clamping member manually actuated so that the first web may also travel through the device in either direction.

Referring now to FIGS. 1-3, one illustrative embodiment of a web position adjusting device 10 is shown. In the illustrated embodiment, the web position adjusting device 10 generally includes a frame or webbing guide 20 and a web clamping member 40 movably mounted to the frame 20. The frame 20 is generally rectangular and illustratively comprises a first end 23 defining one web engaging member 24, an opposite second end 25 defining another web engaging member 28 and a pair of spaced apart sidewalls 22A and 22B extending therebetween. In the illustrated embodiment, the pair of upstanding sidewalls 22A and 22B define corresponding holes or bores 32A and 32B therethrough that are aligned with each other.

The web engaging member 24 defines a web engaging surface 26 along a top portion thereof. The web engaging member 28 defines a back wall 28A that generally faces the web engaging member 24, and another web engaging surface 28B along a top portion of the web engaging member 28. In the illustrated embodiment, the web engaging surface 28B extends generally further away from the bottom 27 of the frame 20 than does the web engaging surface 26 as most clearly illustrated in FIGS. 2-4. In other words, if the web engaging surface 26 of the web engaging member 24 defines a plane within the frame 20, the web engaging surface 28B of the web engaging member 28 is positioned, relative to the frame 20, generally above this plane. Alternative configurations of the frame 20 are contemplated wherein the web engaging surfaces 26 and 28B may be co-planar, or wherein the web engaging surface 28B of the web engaging member 28 is positioned, relative to the frame 20, generally below the plane defined by the web engaging surface 26 of the web engaging member 24.

It will be understood that while the web engaging surfaces 26 and 28B are illustrated as being generally parallel relative to each other, this need not be the case and the surfaces 26 and 28B may alternatively be configured to be non-parallel relative to each other. It will further be understood that while the back wall 28A of the web engaging member 28 is illustrated as being generally perpendicular to the web engaging surfaces 26 and 28B, this also need not be the case and the back wall 28A may alternatively be configured to be non-perpendicular to either one or both of the web engaging surfaces 26 and 28B. In any case, the web engaging members 26 and 28 are spaced apart, relative to the sidewalls 22A and 22B, and define a channel 30 therebetween. It will be understood that while the channel 30 is illustrated in the figures as being an open channel through the frame 20, the present disclosure contemplates that the frame 20 may alternatively be configured such that the channel 30 is partially or fully closed adjacent to the bottom end 27 of the frame 20.

In the illustrated embodiment, the web engaging surface 26 of the web engaging member 24 is ribbed, with any desired number of ribs extending generally between the sidewalls 22A and 22B to facilitate gripping of a web, belt or harness. It will be appreciated, however, that web engaging surface 26 may alternatively be enhanced with any desired profile, pattern, one or more protrusions and/or material adapted to facilitate engagement of a web in contact therewith. Examples of such profiles and/or material include, but are not limited to, a knurled surface, a toothed surface, a sheath of a suitable web engaging material disposed on the web engaging surface 26, and the like. In some applications, the web engaging surface 26 may alternatively be generally smooth as long as such a generally smooth surface will not adversely affect operation of the device 10 as will be described in greater detail hereinafter. As further illustrated in FIGS. 1-4, it is desirable to configure the web engaging surface 28B of the web engaging member 28 as a smooth surface for facilitating smooth travel over the web engaging surface 28B of a web, belt or strap, although the present disclosure contemplates providing the web engaging surface 28B with any desired profile, pattern or the like.

The web clamping member 40 is movably mounted or attached to the frame 20. In the illustrated embodiment, the web clamping member 40 is pivotally attached to the sidewalls 22A and 22B of the frame 20 via a pin 54. In this embodiment, the web clamping member 40 defines a bore 52 therethrough that generally aligns with the holes 32A and 32B through the frame 20, and the pin 54 extends through the holes 32A and 32B of the frame 20 and through bore 52 to thereby pivotally mount the web clamping member 40 to the frame 20, as most clearly illustrated in FIG. 1. It will be appreciated that the web clamping member 40 may be otherwise movably mounted to sidewalls 22A and 22B via one or more suitable attachment or mounting mechanisms. As one example, the web clamping member 40 may alternatively define a pair of bores extending into opposite sides of the web clamping member 40 that each generally align with a corresponding one of the holes 32A and 32B through the frame 20. In this alternative embodiment, a pair of suitably sized pins may be provided with one extending through the hole 32A and into a corresponding bore defined in one side of the web clamping member 40, and the other extending through the hole 32B and into a corresponding bore defined in the opposite side of the web clamping member 40 to thereby movably mount the web clamping member 40 to the frame 20.

In any case, the web clamping member 40 defines a web engaging surface 46 that is positioned generally opposite to the web engaging surface 26 of the frame 20 when the web clamping member 40 is mounted to the frame 20 so that the web engaging surfaces 26 and 46 define opposing web engaging surfaces. In embodiments wherein the web clamping member 40 is pivotally mounted to the frame 20 as illustrated in the figures, the web engaging surface 46 of the web clamping member 40 is positioned rotatably opposite to the web engaging surface 26 of the frame 20.

In the illustrated embodiment, the web engaging surface 46 of the web clamping member 40 is a toothed surface, with any desired number of teeth extending generally between the opposite sides of the web clamping member 40 to facilitate gripping of a web, belt or harness. It will be appreciated, however, that web engaging surface 46 may alternatively be enhanced with any desired profile, pattern, one or more protrusions and/or material adapted to facilitate engagement of a web in contact therewith. Examples of such profiles and/or material include, but are not limited to, a knurled surface, a ribbed surface, a sheath of a suitable web engaging material disposed on the web engaging surface 46, and the like. In some applications, the web engaging surface 46 may alternatively be generally smooth as long as such a generally smooth surface will not adversely affect operation of the device 10 as will be described in greater detail hereinafter.

Figure 4:
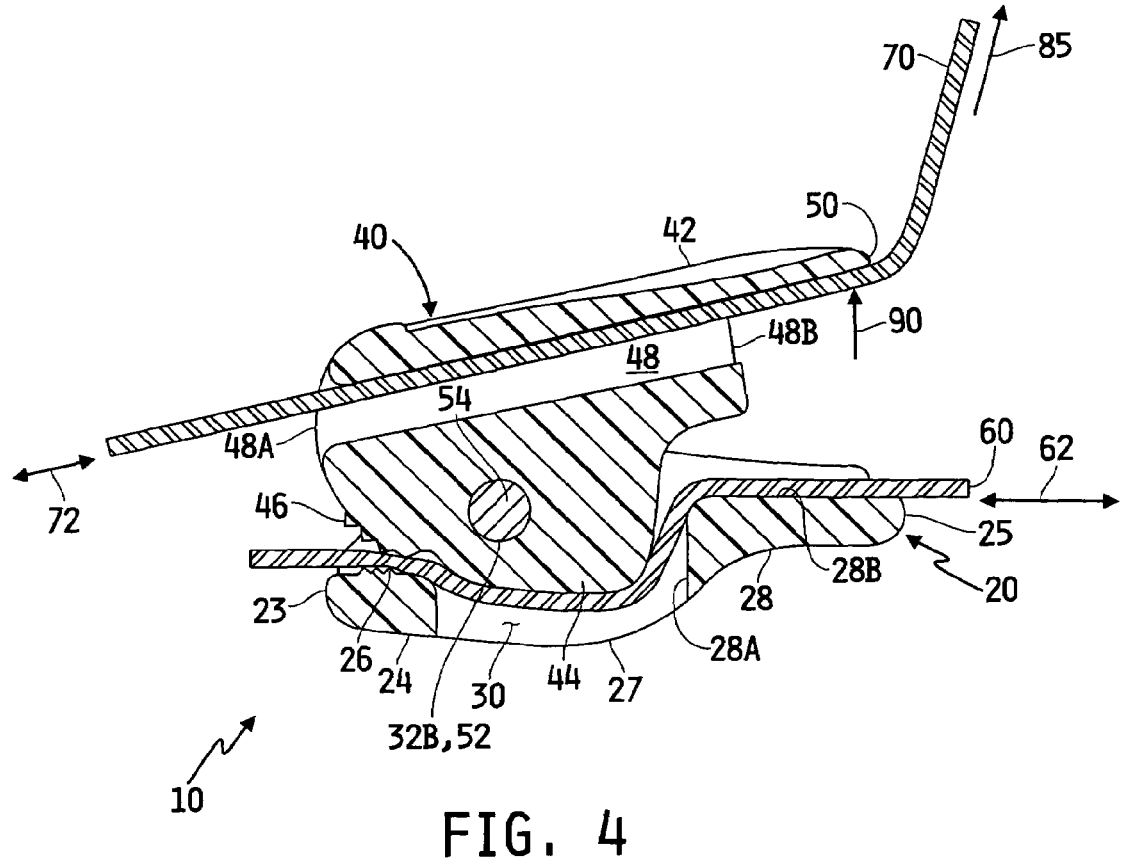
FIG. 4 is a cross-section of the web position adjusting device of FIG. 1, viewed along section lines 2,3,4-2,3,4, illustrating the second web applying force to the web clamping member in a manner that further urges the web clamping surface of the web clamping member toward the web clamping surface of the frame to increase the clamping force on the first web.

The device 10 is generally configured to receive a first web 60 therethrough between the pair of sidewalls 22A and 22B and in contact with the web engaging surfaces 26 and 28B of the frame 20 as illustrated in FIGS. 2-4. When the web clamping member 40 is mounted to the frame 20, the device 10 is further generally configured to normally clamp the first web 60 between the web engaging surfaces 26 and 46 of the frame 20 and web clamping member 40 respectively, as illustrated in FIG. 2, so that the first web 60 is inhibited from moving in either direction 62 of web travel through the device 10. The term "normally clamp" is defined, for the purpose of this disclosure, as clamping, trapping or otherwise inhibiting travel of the web 60 through the device 10 when the web clamping member 40 is mounted to the frame 20 and is not being manually actuated. In the illustrated embodiment, this is achieved by providing the web clamping member 40 with a protrusion or lobe 44 that extends generally downwardly away from the web engaging surface 46. The channel 30 defined between the two web engaging members 24 and 28 of the frame 20 is sized to receive the protrusion or lobe 44 therein. The protrusion or lobe 44 and channel 30 are sized and generally shaped in a manner that causes the first web 60 to exert an upward force on the protrusion or lobe 44 when the first web 60 extends through the device 10 as indicated by the arrow 45 shown in FIG. 2. This upward force of the first web 60 on the protrusion or lobe 44, resulting from the first web 60 extending through the device 10, results in a net downward force of the web engaging surface 46 of the web clamping member 40 against the first web 60 as indicated by the arrow 47 shown in FIG. 2. This arrangement thus results in the first web 60 being normally clamped between the web engaging surface 46 of the web clamping member 40 and the web engaging surface 26 of the frame 20 as illustrated in FIG. 2.

The present disclosure contemplates other structures and/or mechanisms for biasing the web engaging surface 46 of the web clamping member 40 toward the web engaging surface 26 of the frame 20 so that the first web 60 is normally clamped between the web engaging surface 46 of the web clamping member 40 and the web engaging surface 26 of the frame 20. As one example, one or more conventional springs may be positioned between the frame 20 and the web clamping member 40, wherein such one or more conventional springs are configured to normally bias the web engaging surface 46 of the web clamping member 40 toward the web engaging surface 26 of the frame 20 with sufficient force to normally clamp the first web 60 therebetween. In this example, the protrusion or lobe 44 may or may not be omitted. Those skilled in the art will recognize other conventional structures and/or mechanisms for normally biasing the web engaging surface 46 of the web clamping member 40 toward the web engaging surface 26 of the frame 20 so that the first web 60 is normally clamped between the web engaging surfaces 46 and 26, and such alternate structures and/or mechanisms are intended to fall within the scope of this disclosure.

The web clamping member 40 further defines a web slot 48 therethrough between a first web opening 48A, positioned generally above the web engaging surface 46 of the web clamping member 40, and a second web opening 48B positioned generally above the web engaging surface 28B of the frame 20. The web slot 48 is configured to slidingly receive therethrough a second web, belt or tether 70. The term "slidingly receive" is defined, for the purpose of this disclosure, as receiving the second web 70 through the slot 48 so that it may travel through the slot 48 in either direction 72 with no restrictions or impediments to its travel through the slot 48 other than from the walls and/or ends 48A and 48B of the channel 48 itself. The second web 70 may thus travel relatively freely through the web slot 48 of the web clamping member 40 in either direction 72. While the direction 72 is illustrated in FIGS. 2-4 as being generally parallel with the direction 62, the present disclosure contemplates that the web 60 and/or web 70 may alternatively be oriented such the directions 62 and 72 are non-parallel. Also, while the web slot 48 is illustrated in the figures as being defined through the web clamping member 40, the web slot 48 may, in alternate implementations of the device 10, be defined through the frame 20.

The web clamping member 40 further defines a flange 50 that extends from the top portion 42 of the web clamping member 40 in a rearward direction away from the second opening 48B of the web slot 48 such that the second web 70 extends through the device 10 between the flange 50 and the frame 20. In one embodiment, the frame 20 and the web clamping member 40 are formed from a rigid polymer, although the present disclosure contemplates that the frame 20 and/or web clamping member 40 may alternatively be formed from any suitable rigid material such as steel or other metal alloy, plastic resin, nylon, or the like, and/or from any suitable flexible material such as rubber, or the like. In general, the profiles of the web engaging surfaces 26 and 46 of the frame 20 and the web clamping member 40 respectively may be variously configured, taking into account the material compositions of frame 20 and web clamping member 40 and the web load force capacities thereof as well as web integrity concerns. For example, in cases where the frame 20 and the web clamping member 40 are both formed of a polymer material, it may be desirable to provide both of the web engaging surfaces 26 and 46 with web engaging profiles as illustrated in FIGS. 1-4 in order to share the web load force under web locking conditions between the frame 20 and the web clamping member 40. With such materials, damage to the first web 60 due to repeated gripping or clamping between the web engaging surfaces 26 and 46 will likely be minimal as compared with metal components, and providing both surfaces 26 and 46 with web engaging profiles will therefore generally not be a concern. However, in cases where both frame 20 and the web clamping member 40 are formed of steel or other metal alloy, potential web damage due to repeated clamping or gripping between the web engaging surfaces 26 and 46 may be a greater concern, and load sharing between the frame 20 and the web clamping member 40 less of a concern. In such cases, it may accordingly be desirable to configure only one of the surfaces 26 and 46 with a web engaging profile while configuring the remaining surface with a smooth profile. With this configuration, more web load force will typically be borne by the component having a web engaging surface, yet web damage will be minimized. The present disclosure accordingly contemplates myriad combinations of surface profiles for web engaging surfaces 26 and 46.

The web clamping member 40 is manually actuatable to release the first web 60 from being normally clamped between the web clamping surfaces 26 and 46. As illustrated in FIG. 3, a force directed generally in a downward direction 80 on the flange 50, or on the top portion 42 of the web clamping member 40 adjacent to the flange 50, causes the protrusion or lobe 44 to also exert a force generally in the downward direction 80 against the first web 60. When the downward force applied to the top portion 42 of the web clamping member 40 is sufficiently high to overcome the upward force applied by the first web 60 on the protrusion or lobe 44, the web engaging surface 46 of the web clamping member 40 moves away from the web engaging surface 26 and first web 60 while the protrusion or lobe 44 moves downwardly and forces the first web 60 deeper into the channel 30. With the web engaging surface 46 of the web clamping member 40 moved away from the first web 60, the first web 60 may then travel through the device 10 in either direction 62. The position of the first web 60 relative to the second web 70 may thus be adjusted by applying a downward force on the top of the flange 50, or on the top surface 42 of the web clamping member 42 adjacent to the flange 50, that is sufficient to separate the web engaging surface 46 of the web clamping member 40 from the web 60, or that at least sufficiently reduces the clamping force applied by the web engaging surfaces 46 and 26 on the first web 60, so that the first web 60 may travel through the device 10, then sliding the device 10 along the first web 60 to a desired position, and then releasing the downward force on the web clamping member 40 so that the first web 60 again becomes normally clamped between the web clamping surfaces 26 and 46.

The flange 50 is also responsive to a generally upward force 90 applied thereto by the second web 70 to further urge the web engaging surface 46 of the web clamping member 40 toward the first web 60 and the web engaging surface 26 of the frame, as illustrated in FIG. 4. Thus, as the upward force applied by the second web 70 against the flange 50 increases, so too does the clamping force applied by the web engaging surfaces 26 and 46 against the first web 60.

The web position adjusting device 10 illustrated and described herein provides a web routing or pass-through mechanism for a second web 70 that may be adjustably positioned relative to a first web 60. One example implementation of the device 10 is as a so-called web height adjuster for a shoulder harness portion of a vehicle seat restraint system. In this implementation, the first web 60 represents a stationary or fixed-position web relative to the vehicle seat, the second web 70 represents a shoulder or torso restraining web forming part of a multiple-point restraint harness, and the device 10 is positioned on the web 60 generally above the shoulder of the seat occupant and oriented with the end 25 of the frame 20 and the flange 50 of the web clamping member 40 directed toward the shoulder of the occupant. In this implementation, the device 10 may be adjustably positioned as described herein to locate the routing or pass-through point of the web 70 relative to the web 60 at any desired height above the occupant's shoulder. If the occupant moves forward in the seat, such as during a frontal vehicle impact, the web 70 will exert an upward force on the flange 50, as illustrated in FIG. 4, thereby further urging the web engaging surface 46 of the web clamping member 40 toward the first web 60 and the web engaging surface 26 of the frame, and thereby increasing the clamping force applied by the web engaging surfaces 26 and 46 against the first web 60. Example restraint systems implementing the device 10 in the manner just described are disclosed in co-pending International Patent Application Pub. No. WO 2005/037605, entitled VEHICLE SAFETY RESTRAINT SYSTEM, and U.S. Patent Application Ser. No. 60/695,192, entitled PORTABLE RESTRAINT SYSTEM, which are each assigned to the assignee of the subject disclosure, and the disclosures of which are incorporated herein by reference. Those skilled in the art will recognize other implementations of the web position adjusting device 10 illustrated and described herein, and such other implementations are intended to fall within the scope of this disclosure.

While the invention has been illustrated and described in detail in the foregoing drawings and description, the same is to be considered as illustrative and not restrictive in character, it being understood that only one illustrative embodiment thereof has been shown and described and that all changes and modifications that come within the spirit of the invention are desired to be protected.

What is claimed is:

1. A web position adjusting device comprising:
    a first web,
    a second web separate from said first web,
    a frame having a first web engaging surface to engage said first web, and
    a web clamping member movably mounted to the frame and having a second web engaging surface to engage said first web,
    wherein said first web is extendable between the frame and the web clamping member with the first web normally clamped between the first and second web engaging surfaces, the web clamping member movable relative to the frame to move the second web engaging surface away from the first web engaging surface to allow travel of the first web through the device,
    and wherein the device has a passage to receive and allow unimpeded travel therethrough of the second web along same directions of travel of the first web through the device, the web clamping member further has a flange with the second web positioned between the flange and the frame, the web clamping member responsive to force applied by the second web against the flange to further urge the second web engaging surface of the web clamping member toward the first web engaging surface of the frame and thereby increase a clamping force of the first and second web engaging surfaces against the first web.

2. The web position adjusting device of claim 1 wherein the web clamping member further defines a protrusion extending into the frame, the protrusion contactable with the first web so that the first web forces the second web engaging surface toward the first web engaging surface to normally clamp the first web between the first and second web engaging surfaces.

3. The web position adjusting device of claim 2 wherein the web clamping member is movable relative to the frame to force the protrusion against the first web while moving the second web engaging surface away from the first web engaging surface to thereby allow travel of the first web through the device.

4. The web position adjusting device of claim 3 wherein the frame defines a third web engaging surface to contact the first web, the first and third web engaging surfaces of the frame defining a channel therebetween sized to receive the protrusion of the web clamping member therein.

5. The web position adjusting device of claim 1 wherein the web clamping member defines a web slot therethrough, the web slot having a first web opening positioned over the second web engaging surface and a second web opening, the web slot receives the second web therethrough.

6. The web position adjusting device of claim 1 wherein the frame includes a pair of sidewalls with the first web engaging surface extending therebetween, and wherein the web clamping member is pivotally mounted to the frame between the pair of sidewalls.

7. The web position adjusting device of claim 1 wherein the web clamping member has a handle portion for manual manipulation of the web clamping member.

8. A web position adjusting device for slidably adjusting the position of a second web relative to a first web comprising:
    a frame having a pair of sidewalls, the frame defining first and second web engaging surfaces each extending between the pair of sidewalls, the first and second web engaging surfaces spaced apart to define a channel therebetween, the frame configured to receive a first web therethrough extending between the pair of sidewalls and in contact with the first and second web engaging surfaces, and
    a web clamping member movably mounted to the frame between the pair of sidewalls and defining a third web engaging surface opposite to the first web engaging surface of the frame, the web clamping member further having a protrusion extending into the channel, the protrusion configured to contact the first web so that the first web forces the third web engaging surface of the web clamping member toward the first web engaging surface of the frame to normally clamp the first web between the first and third web engaging surfaces locating said frame and said web clamping member at a fixed position on said first web until said first and third web engaging surfaces are not clamped on said first web, the web clamping member having a passage allowing said second web to slidably extend unimpeded therethrough along same directions of travel of the first web through the device and being positioned relative to said first web depending on said fixed position, the web clamping member further having a portion to receive force applied by the second web against the portion to further nine the third web engaging surface of the web clamping member toward the first web engaging surface of the frame and thereby increase a clamping force of the first and third web engaging surfaces against the first web,
    the frame and web clamping member slidably mounted together along the first web and the second web but lockable in position on the first web when the first web engaging surface surface is apart from the third web engaging surface thereby locating the second web relative to the first web.

9. The web position adjusting device of claim 8 wherein the web clamping member is movable relative to the frame to force the protrusion against the first web while moving the third web engaging surface away from the first web engaging surface to thereby allow travel of the first web through the device.

10. The web position adjusting device of claim 8 wherein the web clamping member defines a web slot therethrough, the web slot having a first web opening positioned over the third web engaging surface and a second web opening, the web slot configured to receive the second web therethrough so that the second web may travel through the web clamping member along same directions of travel of the first web through the device.

11. The web position adjusting device of claim 10 wherein the web clamping member further defines a flange extending beyond the second web opening with the second web positioned between the flange and the frame, the web clamping member responsive to force applied by the second web against the flange to further urge the third web engaging surface of the web clamping member toward the first web engaging surface of the frame and thereby increase a clamping force of the first and third web engaging surfaces against the first web.

12. The web position adjusting device of claim 8 wherein the web clamping member is pivotally mounted to the frame between the pair of sidewalls.

13. The web position adjusting device of claim 8 wherein the web clamping member defines a handle portion configured for manual manipulation of the web clamping member.

14. A web position adjusting device comprising:
a frame defining a first web engaging surface,
a web clamping member movably mounted to the frame and defining a second web engaging surface opposite to the first web engaging surface of the frame,
a first web extending through the device between the frame and the web clamping member, the first web normally clamped between the first and second web engaging surfaces, the web clamping member movable relative to the frame to move the second web engaging surface away from the first web engaging surface to travel of the first web through the device, and
a second web slidingly received through the web clamping member, the web clamping member has a web slot, the web slot having a first web opening positioned over the second web engaging surface and a second web opening, the web slot receives the second web therethrough so that the second web may travel through the web clamping member along same directions of travel of the first web through the device, the web clamping member further defines a portion located beyond the second web opening with the second web positioned between the portion and the frame, the web clamping member responsive to force applied by the second web against the portion to further urge the second web engaging surface of the web clamping member toward the first web engaging surface of the frame and thereby increasing the clamping force of the first and second web engaging surfaces against the first web.

15. The web position adjusting device of claim 14 wherein the web clamping member further defines a protrusion extending into the frame, the protrusion configured to contact the first web so that the first web forces the second web engaging surface toward the first web engaging surface to normally clamp the first web between the first and second web engaging surfaces.

16. The web position adjusting device of claim 15 wherein the web clamping member is movable relative to the frame to force the protrusion against the first web while moving the second web engaging surface away from the first web engaging surface to thereby allow travel of the first web through the device.

17. The web position adjusting device of claim 16 wherein the frame defines a third web engaging surface to contact the first web, the first and third web engaging surfaces of the frame defining a channel therebetween sized to receive the protrusion of the web clamping member therein.

18. A web position adjusting device comprising:
a frame defining a first web engaging surface,
a web clamping member movably mounted to the frame and defining a second web engaging surface opposite to the first web engaging surface of the frame,
a first web extending through the device between the frame and the web clamping member, the first web normally clamped between the first and second web engaging surfaces, the web clamping member movable relative to the frame to move the second web engaging surface away from the first web engaging surface to allow travel of the first web through the device, and
a second web slidingly received through the device, and
wherein the web clamping member to slidingly receives the second web therethrough;
wherein the web clamping member defines a web slot therethrough, the web slot having a first web opening positioned over the second web engaging surface and a second web opening, the web slot configured to receive the second web therethrough so that the second web may travel through the web clamping member along same direction of travel of the first web through the device,
the web clamping member further defines a flange extending beyond the second web opening with the second web positioned between the flange and the frame, the web clamping member responsive to force applied by the second web against the flange to further urge the second web engaging surface of the web clamping member toward the first web engaging surface of the frame and thereby increase a clamping force of the first and second web engaging surfaces against the first web.

19. The web position adjusting device of claim 18 wherein the web clamping member is pivotally mounted to the frame.

20. The web position adjusting device of claim 18 wherein the web clamping member defines a handle portion configured for manual manipulation of the web clamping member.

* * * * *

UNITED STATES PATENT AND TRADEMARK OFFICE
CERTIFICATE OF CORRECTION

PATENT NO. : 7,506,413 B2  Page 1 of 1
APPLICATION NO. : 11/232714
DATED : March 24, 2009
INVENTOR(S) : Guy R. Dingman, Donald C. Boyle and Thomas Mashino It is certified that error appears in the above-identified patent and that said Letters Patent is hereby corrected as shown below:

In column 8, line 56, claim 8 please change "nine" to --urge--.

Signed and Sealed this

Ninth Day of June, 2009

JOHN DOLL
*Acting Director of the United States Patent and Trademark Office*